(12) United States Patent
Kuhlmann et al.

(10) Patent No.: US 8,239,914 B2
(45) Date of Patent: Aug. 7, 2012

(54) HIGHLY INTEGRATED SINGLE CHIP SET-TOP BOX

(75) Inventors: Martin Kuhlmann, Singapore (SG); Ramon A. Gomez, San Juan Capistrano, CA (US); Loke Tan, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 826 days.

(21) Appl. No.: 11/187,009

(22) Filed: Jul. 22, 2005

(65) Prior Publication Data

US 2006/0026657 A1 Feb. 2, 2006

Related U.S. Application Data

(60) Provisional application No. 60/589,844, filed on Jul. 22, 2004.

(51) Int. Cl.
*H04N 7/16* (2011.01)
(52) U.S. Cl. ............ 725/151; 725/100; 725/131
(58) Field of Classification Search .......... 725/151
See application file for complete search history.

(56) References Cited

U.S. PATENT DOCUMENTS

| | | | |
|---|---|---|---|
| 4,006,420 A | 2/1977 | Schittko | |
| 4,162,452 A | 7/1979 | Ash | |
| 4,340,975 A | 7/1982 | Onishi et al. | |
| 4,352,209 A | 9/1982 | Ma | |
| 4,408,347 A | 10/1983 | Ash | |
| 4,408,349 A | 10/1983 | Yukawa | |
| 4,496,979 A | 1/1985 | Yu et al. | |
| 4,555,809 A | 11/1985 | Carlson | |
| 4,855,835 A | 8/1989 | Tobita | |
| 4,858,159 A | 8/1989 | Wheelwright et al. | |
| 5,020,147 A | 5/1991 | Okanobu | |
| 5,200,826 A | 4/1993 | Seong | |
| 5,321,852 A | 6/1994 | Seong | |
| 5,325,401 A * | 6/1994 | Halik et al. .......... | 375/329 |
| 5,554,987 A | 9/1996 | Ooga | |
| 5,564,098 A | 10/1996 | Rodal et al. | |
| 5,568,512 A | 10/1996 | Rotzoll | |
| 5,584,066 A | 12/1996 | Okanobu | |
| 5,625,307 A | 4/1997 | Scheinberg | |
| 5,625,325 A | 4/1997 | Rotzoll et al. | |
| 5,692,279 A | 12/1997 | Mang et al. | |

(Continued)

FOREIGN PATENT DOCUMENTS

EP 0473373 A2 3/1992

(Continued)

OTHER PUBLICATIONS

Conexant's "Single-Chip DBS Set-Top Box System Solution—CX24152/5" Published 2003, Set-top Box Solutions.*

(Continued)

*Primary Examiner* — Hai V Tran
*Assistant Examiner* — Junior Mendoza
(74) *Attorney, Agent, or Firm* — Sterne, Kessler, Goldstein & Fox P.L.L.C.

(57) ABSTRACT

A highly integrated set-top box is implemented on a single semiconductor substrate. For instance, an analog RF tuner is implemented on the same substrate with a digital receiver, and audio-video back-end circuits. The single chip set-top box can be used for satellite, cable, internet, or terrestrial TV applications, or other applications. As a result, the substrate area, assembly time, and associated costs per chip are reduced.

30 Claims, 7 Drawing Sheets

U.S. PATENT DOCUMENTS

| | | | |
|---|---|---|---|
| 5,734,589 A | 3/1998 | Kostreski et al. | |
| 5,737,035 A | 4/1998 | Rotzoll | |
| 5,739,730 A | 4/1998 | Rotzoll | |
| 5,742,208 A * | 4/1998 | Blazo | 331/23 |
| 5,757,220 A | 5/1998 | Murden et al. | |
| 5,790,946 A | 8/1998 | Rotzoll | |
| 5,822,687 A | 10/1998 | Bickley et al. | |
| 5,847,612 A | 12/1998 | Birleson | |
| 5,856,975 A | 1/1999 | Rostoker et al. | |
| 5,930,696 A | 7/1999 | Tzuang et al. | |
| 6,011,962 A | 1/2000 | Lindenmeier et al. | |
| 6,041,056 A | 3/2000 | Bigham et al. | |
| 6,088,402 A * | 7/2000 | White | 375/326 |
| 6,100,755 A * | 8/2000 | Ishii | 329/304 |
| 6,154,640 A * | 11/2000 | Itoh et al. | 455/76 |
| 6,163,684 A | 12/2000 | Birleson | |
| 6,177,964 B1 | 1/2001 | Birleson et al. | |
| 6,370,603 B1 | 4/2002 | Silverman et al. | |
| 6,377,315 B1 | 4/2002 | Carr et al. | |
| 6,438,123 B1 | 8/2002 | Chapman | |
| 6,484,042 B1 | 11/2002 | Loke | |
| 6,522,177 B1 * | 2/2003 | Spampinato | 327/107 |
| 6,535,510 B2 | 3/2003 | Kalkunte et al. | |
| 6,693,980 B1 * | 2/2004 | Linder et al. | 375/329 |
| 6,757,909 B1 | 6/2004 | Maruo et al. | |
| 6,778,611 B1 | 8/2004 | Ungerboeck | |
| 6,807,193 B1 | 10/2004 | Beser | |
| 6,816,548 B1 * | 11/2004 | Shiue et al. | 375/233 |
| 6,886,180 B1 | 4/2005 | Sandberg et al. | |
| 6,914,883 B2 | 7/2005 | Dharanikota | |
| 6,941,576 B2 * | 9/2005 | Amit | 725/143 |
| 6,993,016 B1 | 1/2006 | Liva et al. | |
| 7,006,318 B2 | 2/2006 | Stence et al. | |
| 7,017,176 B1 | 3/2006 | Lee et al. | |
| 7,113,484 B1 | 9/2006 | Chapman et al. | |
| 7,120,427 B1 | 10/2006 | Adams et al. | |
| 7,136,381 B2 | 11/2006 | Battle et al. | |
| 7,146,007 B1 | 12/2006 | Maruo et al. | |
| 7,207,106 B2 | 4/2007 | Abe et al. | |
| 7,245,638 B2 | 7/2007 | Agazzi et al. | |
| 7,327,726 B2 | 2/2008 | Kye | |
| 7,379,472 B2 | 5/2008 | Pantelias et al. | |
| 7,391,243 B2 * | 6/2008 | Choi | 327/156 |
| 7,522,901 B2 | 4/2009 | Dauphinee | |
| 7,535,976 B2 | 5/2009 | Jaffee et al. | |
| 7,554,978 B1 | 6/2009 | Parker | |
| 2001/0033200 A1 * | 10/2001 | Staszewski et al. | 331/18 |
| 2001/0053319 A1 | 12/2001 | Quigley et al. | |
| 2002/0042255 A1 * | 4/2002 | Prentice | 455/232.1 |
| 2002/0065907 A1 | 5/2002 | Cloonan et al. | |
| 2002/0073431 A1 | 6/2002 | Nikolich | |
| 2002/0080898 A1 | 6/2002 | Agazzi et al. | |
| 2002/0093970 A1 | 7/2002 | Amit | |
| 2002/0106018 A1 * | 8/2002 | D'Luna et al. | 375/240.01 |
| 2002/0131426 A1 | 9/2002 | Amit et al. | |
| 2002/0176416 A1 | 11/2002 | Ben-Ze'ev et al. | |
| 2002/0188957 A1 | 12/2002 | Jantzi et al. | |
| 2003/0061623 A1 | 3/2003 | Denney et al. | |
| 2004/0028151 A1 * | 2/2004 | Arambepola et al. | 375/316 |
| 2004/0172658 A1 | 9/2004 | Rakib et al. | |
| 2004/0176058 A1 * | 9/2004 | Johnson | 455/147 |
| 2004/0230997 A1 | 11/2004 | Kaylani | |
| 2004/0266376 A1 * | 12/2004 | Cowley et al. | 455/150.1 |
| 2005/0071882 A1 | 3/2005 | Rodriguez et al. | |
| 2005/0094714 A1 | 5/2005 | Robinson | |
| 2005/0157818 A1 | 7/2005 | Dauphinee | |
| 2005/0226242 A1 | 10/2005 | Parker | |
| 2005/0259186 A1 * | 11/2005 | Mehr et al. | 348/731 |
| 2005/0262542 A1 | 11/2005 | DeWeese et al. | |
| 2005/0264335 A1 * | 12/2005 | Soe | 327/261 |
| 2006/0001779 A1 * | 1/2006 | Favrat et al. | 348/725 |
| 2006/0023813 A1 | 2/2006 | Jaffe et al. | |
| 2006/0026657 A1 | 2/2006 | Kuhlmann et al. | |
| 2006/0026659 A1 | 2/2006 | McMullin et al. | |
| 2006/0026661 A1 | 2/2006 | McMullin et al. | |
| 2006/0064583 A1 | 3/2006 | Birnbaum et al. | |
| 2006/0123457 A1 | 6/2006 | Chen et al. | |
| 2006/0203901 A1 | 9/2006 | Tan et al. | |
| 2007/0030806 A1 | 2/2007 | Pantelias et al. | |
| 2007/0214482 A1 | 9/2007 | Nguyen | |
| 2007/0291784 A1 | 12/2007 | Chan et al. | |
| 2007/0294738 A1 | 12/2007 | Kuo et al. | |
| 2008/0020797 A1 | 1/2008 | Denney et al. | |
| 2008/0198269 A1 | 8/2008 | Gomez | |

FOREIGN PATENT DOCUMENTS

| | | |
|---|---|---|
| WO | WO 00/76265 A1 | 12/2000 |
| WO | WO 01/17168 A2 | 3/2001 |
| WO | WO 01/74079 A1 | 10/2001 |
| WO | WO 02/47383 A1 | 6/2002 |

OTHER PUBLICATIONS

"Broadcom Touts Single-Chip Set-Top Box". Michael Singer. May 21, 2002. http://www.technewsplanet.com/infra/article.php/1142411.*

Mitsubishi Electric Research Laboratoties (METL) "Direct-conversion Tuner for terrestrial, cable and satellite digital TV" Aug. 1, 2001 . Hereinafter, referenced as METL.*

Ducourant et al., "A 3 Chip G&As Double Conversion TV Tuner System With 70 dB Image Rejection," *IEEE 1989 Microwave and Millimeter-Wave Monolithic Circuits Symposium*, pp. 87-90.

Farmer, "Specifications for Tuner Design for Use in Cable Ready Television Receivers and VCRs," *IEEE Transactions on Consumer Electronics*, vol. 36, No. 3, Aug. 1990, pp. 660-668.

Maas, "Microwave Mixers," Artech House, Copyright, 1986, pp. 248-251.

Droitcourt, J.L., "Understanding How Interactive Television Set Top Box Works . . . And What It Will Mean to the Customer," International Broadcasting Convention (Sep. 14-18, 1995, London, England), Conference Publication No. 413, pp. 382-394, IEE (1995).

"BCM 7110 Single-Chip Set-Top Box with DOCSIS 1.1 and PVR" [online], Product Brief, Broadcom Corporation (2002) [retrieved on Aug. 22, 2002]. Retrieved from the Internet: <URL: http://www.broadcom.com/products/7110.html1> (2 pages).

"BCM 7110 Single-Chip Set-Top Box with DOCSIS 1.1 and PVR" [online], Broadcom Products Site Guide [retrieved on Aug. 22, 2002]. Retrieved from the Internet: <URL: http://www.broadcom.com/products/7110.html> (2 pages).

"BCM3345 High-Performance Single-Chip DOCSIS/EURODOCSIS Cable Modem" [online], Broadcom Products Site Guide [retrieved on Oct. 11, 2002]. Retrieved from the Internet: <URL: http://www.broadcom.com/products/3345.html> (2 pages).

"BCM3345 High-Performance Single-Chip EURODOCSIS Cable Modem" [online], BCM3345 Product Brief, Broadcom Corporation (2002) [retrieved on Oct. 11, 2002]. Retrieved from the Internet: <URL: http://www.broadcom.com/products/3345.html> (2 pages).

"BCM3350 QAMlink Single-Chip Cable Modem" [online], Broadcom Products Site Guide [retrieved on Oct. 11, 2002]. Retrieved from the Internet: <URL: http://www.broadcom.com/products/3350.html> (2 pages).

"BCM3350 QAMlink Single-Chip Cable Modem" [online], BCM 3350 Product Brief, Broadcom Corporation (2001) [retrieved on Oct. 11, 2002]. Retrieved from the Internet: <URL: http://www.broadcom.com/products/3350.html> (2 pages).

"BCM3250 QAMLink Advanced Set-Top Box Single-Chip Front-End" [online], Broadcom Product Site Guide [retrieved on Oct. 11, 2002]. Retrieved from the Internet: <URL:http://www.broadcom.com/products/3250.html> (2 pages).

"BCM3250 QAMLink Advanced Set-Top Box Single-Chip Front-End" [online], BCM3250 Product Brief, Broadcom Corporation (2002) [retrieved on Oct. 11, 2002]. Retrieved from the Internet: <URL:http://www.broadcom.com/products/3250.html> (2 pages).

"High-Definition Video UMA Subsystem with 2D Graphics" [online], BCM7020R Products Brief, Broadcom Corporation (2002) [retrieved on Oct. 11, 2002]. Retrieved from the Internet: <URL: http://www.broadcom.com/products/7020.html> (2 pages).

"High-Definition Video UMA Subsystem with 2D Graphics" [online], Broadcom Product Site Guide [retrieved on Oct. 11, 2002]. Retrieved from the Internet: <URL: http://www.broadcom.com/products/7020.html>(2 pages).

Final Office Action for U.S. Appl. No. 11,133,237 mailed Jun. 19, 2009, 26 pages.
Final Office Action for U.S. Appl. No. 11,133,237 mailed May 5, 2010, 26 pages.
Non-Final Office Action for U.S. Appl. No. 11,133,237 mailed Dec. 12, 2008, 19 pages.
Non-Final Office Action for U.S. Appl. No. 11,133,237 mailed Jun. 21, 2011, 20 pages.
Non-Final Office Action for U.S. Appl. No. 11,133,237 mailed Sep. 30, 2009, 21 pages.
Non-Final Office Action for U.S. Appl. No. 11,133,237 mailed Oct. 24, 2011, 23 pages.
Final Office Action for U.S. Appl. No. 11/133,275 mailed Feb. 6, 2009, 20 pages.
Final Office Action for U.S. Appl. No. 11/133,275 mailed May 4, 2010, 25 pages.
Non-Final Office Action for U.S. Appl. No. 11/133,275 mailed Jul. 15, 2011, 23 pages.
Non-Final Office Action for U.S. Appl. No. 11/133,275 mailed Jun. 11, 2008, 18 pages.
Non-Final Office Action for U.S. Appl. No. 11/133,275 mailed Oct. 13, 2009, 21 pages.
Non-Final Office Action for U.S. Appl. No. 11/133,275 mailed Oct. 24, 2011, 23 pages.
van Sinderen, J. et al., "A 48-860MHz Digital Cable Tuner IC with Integrated RF and IF Selectivity", Solid-State Circuits Conference, 2003. Digest of Technical Papers. ISSCC. 2003 IEEE International, 2003, vol. 1, pp. 444-506, ISSN: 0193-6530.
van Sinderen, J., et al., "A 48-860MHz Digital Cable Tuner IC with Integrated RF and IF Selectivity", Powerpoint slides from Solid-State Circuits Conference, Feb. 2003, pp. 1-20.

* cited by examiner

HIGHLY INTEGRATED SINGLE CHIP SET-TOP BOX

CROSS REFERENCED TO RELATED APPLICATIONS

This application claims the benefit of U.S. Provisional Application No. 60/589,844, filed Jul. 22, 2004, which is incorporated herein by reference in its entirety.

BACKGROUND OF THE INVENTION

1. Field of the Invention

The present invention generally relates to a highly integrated single chip satellite set-top box with an integrated tuner, a digital receiver, and various audio and video backend circuits and other circuits including a USB 2.0 Host, and AV security that can be integrated onto a single silicon substrate.

2. Background Art

Set-top boxes are commonly used to receive and decode digital television broadcasts and to interface with the Internet through the user's television instead of a PC. Set-top boxes fall into several categories, from the simplest that receive and unscramble incoming television signals to the more complex that will also function as multimedia desktop computers that can run a variety of advanced services such as videoconferencing, home networking, IP telephony, video-on-demand (VoD) and high-speed Internet TV services.

Conventional set-top boxes are configured so that the analog RF functions are implemented separately from the digital functions of the set-top box. For instance, the analog and digital functions are implemented on separate semiconductor substrates, which increases part-count and the associated cost and assembly time of the set-top device.

What is needed is a set-top box configuration that can be integrated on a single semiconductor substrate.

BRIEF SUMMARY OF THE INVENTION

A highly integrated set-top box is implemented on a single semiconductor substrate, such as a CMOS substrate. For instance, an analog RF tuner is implemented on the same substrate with a digital receiver and audio-video back-end circuits. The single chip set-top box can be used for satellite, cable, cable modem, Internet, or terrestrial TV applications, or other applications. As a result, the substrate area, assembly time, and associated costs per chip are reduced.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
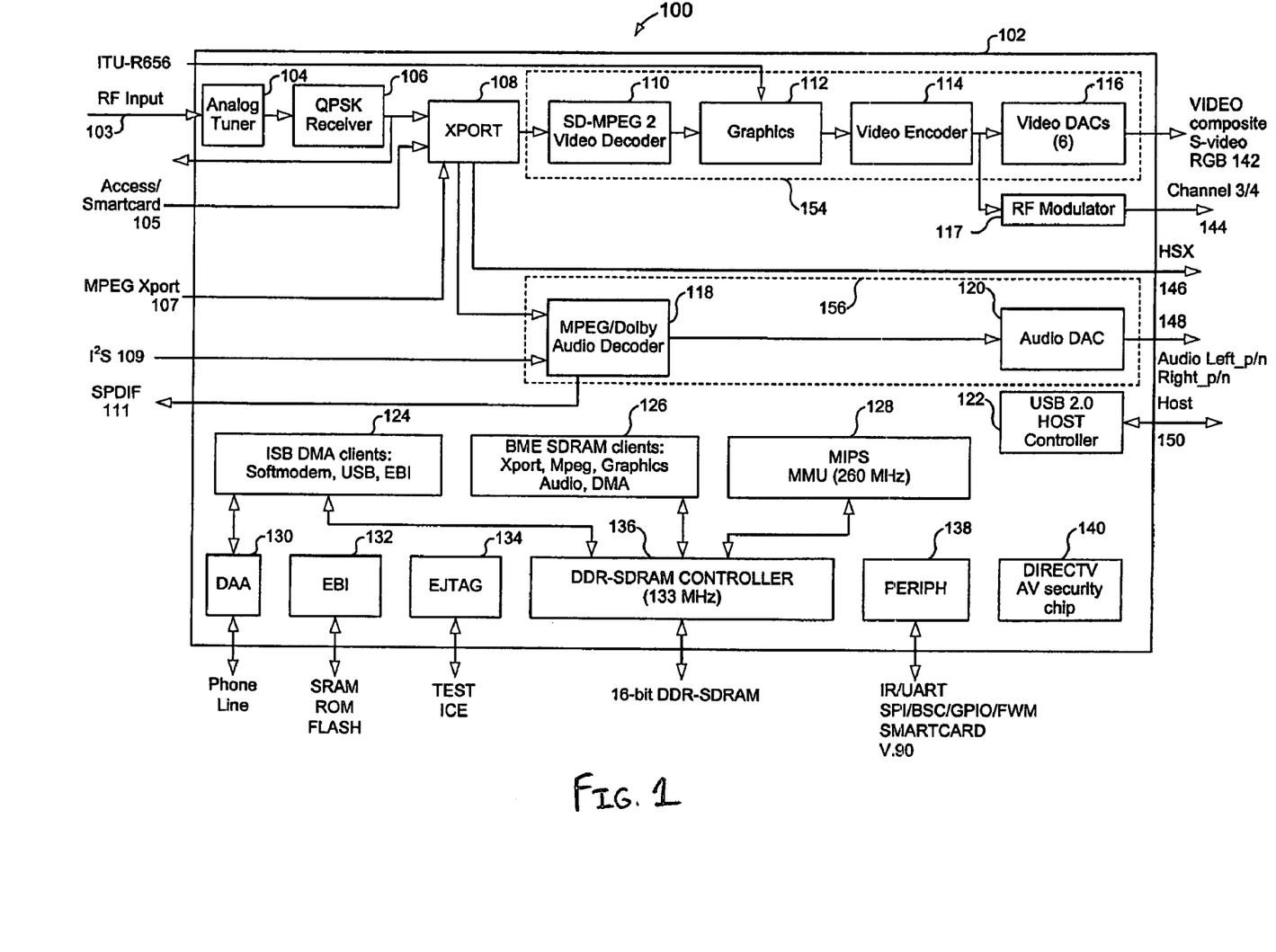
FIG. 1 illustrates a highly integrated set-top box that implements RF functions and digital functions on a common substrate.

FIG. 1 illustrates a highly integrated set-top box that is implemented on a single semiconductor substrate. For example, the substrate can be CMOS or another processing material. More specifically, FIG. 1 illustrates a set-top box 100 that is implemented on a common substrate 102. The set-top box 100 includes RF and IF analog functions, baseband functions, and digital functions on the common substrate 102. For instance, an analog RF tuner is implemented on the same substrate with a digital receiver and audio-video back-end circuits.

The set-top box 100 includes an analog RF tuner 104, a digital satellite QPSK receiver 106, a MPEG-2/DIRECTV data transport processor 108, a SD-video MPEG-2 decoder 110, a Dolby/AC3/MPEG-2 audio decoder 118, 2D/3D graphics technology 112, video encoder 114, video digital-to-analog converters (DACs) 116, audio DACs 120, a RF modulator 117, MIPs32 microprocessor 128, a DIRECTV AV security module 140, USB 2.0 compliant host controller 122, Serial Controller interfaces 136, and the necessary peripherals 138 needed in set-top box applications. Furthermore, the settop box 100 includes all key interfaces to external memory and I/O such as: Data Access Arrangement (DAA) 130, External Bus Interface (EBI) 132, and Enhanced JTAG (boundary scan/IEEE 1149.1) 134. Furthermore, modules related to ISB DMA 124, BME SDRAM clients 126 are also included.

The analog tuner 104 accepts an RF signal stream 103 and down-converts a selected channel that is output to the QPSK receiver 106. The RF signal 103 can include a plurality of channels, one of which is selected and down-converted to baseband by the analog tuner 104 for further processing. Its output can be observed for testing purposes. The digital satellite receiver 106 accepts an analog complex baseband modulated data stream from the analog tuner 104 with variable data rates and delivers a demodulated, error-corrected output data stream to the Xport 108. The receiver 106 consists of dual 8-bit A/D converters, an all-digital variable rate QPSK/OQPSK demodulator, a DVB/DIRECTV/Digicipher II compliant FEC decoder and all required RAM. The invention is not limited to QPSK but can use other types of modulation including but not limited to 8PSK, 16 QAM, 64 QAM, and other modulation schemes known to those skilled in the arts.

The data transport processor 108 is an MPEG-2/DIRECTV transport stream message/PES parser and demultiplexer. It can simultaneously process 64 programmable IDs (PIDs) in up to five independent transport streams, with decryption for all 64 PIDs. It supports message/PES parsing for 32 PIDs with storage to 32 external DRAM buffers, and it provides 32 section filters. In other words, the transport processor 108 receives a digital signal from the output of the QPSK receiver 106 and separates the audio data from the video data in the MPEG packets. The transport processor 108 sends the video data to the video decoder 110 and sends the audio data to the audio decoder 118. Alternatively, either of the audio or video data can be exported external out of the chip via the HSX output 146 as shown in FIG. 1. The transport module 108 can also be accessed or controlled via a smartcard interface 105, and includes an MPEG xport port 107 for off-chip access.

The MPEG-2 Video Decoder 110 is designed to decode SD video streams. Due to its ability to decode at a rapid pace (4× SDrate), it can perform improved trick mode Personal-Video-Recording (PVR) playback. It optionally accepts transport (ATSCMPEG/DirecTV), PES or ES streams and self-sufficiently performs all the requisite decoding functions, and renders the decoded video, in 4:2:2 format. A 16-bit DDR-SDRAM memory subsystem 136 is configured to work as a Unified Memory Architecture, with ample spare bandwidth available for functions other than the video decode.

In other words, the video decoder 110 decodes the video data and passes the decoded video data to the graphics module 112. After processing, the output of the graphics module 112 is sent to the video encoder 114, and then to the video DAC 116. The graphics module 112 can be used to add text to the output of the video decoder 110. The video DAC 116 converts the video signals to analog for output to the S-Video output 142 for display on a conventional television set, or other display. The video decoder 110, graphics module 112, video encoder 114, and the video DACs 116 can be summarized as a video module 154 (as shown in FIG. 1) that receives the digital video portion (MPEG packets) from the output of the transport module 108 and generates the video outputs 142 and 144.

The graphics engine 112 accepts decoded MPEG packets and performs professional quality compositing of text and graphics with video. The design is hardware intensive with software assist to support a variety of RGB, YUV and CLUT pixel formats, with each surface having its own alpha blend. Text rendition is enhanced with the use of anti-flutter filters, which eliminate the flutter effect that is inherent with the interlaced display of high resolution text and imagery while at the same time not affecting the display of normal or scaled live video, which is meant for interlaced display.

An NTSC/PAL/SECAM video encoder 114, optional RF modulator 117, and DACs 116 produce the final composite, S-video 142, and channel 3/4 outputs 144. In other words, the output of the video encoder 114 is frequency translated to channels 3 or 4 by the RF modulator 117 for cable or satellite TV operations.

The MPEG and Dolby Digital Audio Decoder 118 is implemented as several discrete processing functions. The audio decoder 118 receives the audio data from the transport module 108, and decodes the audio data for the audio DAC 120. Data is first processed by up to two of the audio transport and interface processors, which handle synchronization and filtering functions. Next, data is sent to the Dolby Digital and MPEG Audio Decompression Processor included in decoder 118 for conversion from compressed audiodata to uncompressed PCM audio data. The output PCM audio can be output either digitally over an SPDIF interface 111 or in analog mode through a two-channel audio DAC 120 to produce an audio output 148. Additionally, the output of one of the Audio Transport and Interface Processors included in decoder 118 can send compressed Dolby data to the SPDIF module to be output on the SPDIF interface 111 simultaneously with decompressed Dolby or MPEG being output on the DAC output 148. The MPEG Dolby decoder 118 and the audio DAC 120 can be summarized as an audio module 156 (as shown in FIG. 1) that generates the audio output 148 and the SPDIF output 111. The audio decoder 118 also provides access and control via $I^2S$ 109.

The chip contains a 260 MHz MIPS32 microprocessor subsystem 128 with MMU, 32 KB instruction cache, and 32 KB data cache with bridging to memory and a local bus, where external peripherals can be attached through interface 138. Other processors could be used as will be understood by those skilled in the arts. Peripherals that can be connected through interface 138 include UART, Smart Card interface, soft modem interface, counter/timers, GPIO, IR Blaster and Receivers, and a USB host controller and transceiver.

The set-top box 100 can also store the digital input signal from the QPSK receiver 106 to an external or internal DRAM device (not shown) connected to the DRAM interface 136 and the BME arbiter 126. The BME arbiter 126 determines the priority that a transport, audio, graphics, or video client gets when accessing the DRAM device via the DRAM interface 136. The DRAM device offers a temporary fast data storage.

The USB 2.0 compliant host controller 122 supports 480-Mbps high-speed serial data transmission, and 12-Mbps and 1.5-Mbps low-speed serial data transmission. The USB Interface 122 is capable of connecting to a Universal Serial Bus 150 that can be used to receive MPEG packets for processing in the set-top box 100. For example, the USB interface 122 can be used to send MPEG packets from one set-top box to another set-top box for processing and display. By doing so, one or more set-top boxes (in a home or a building for example) could be networked together so that programming (movies, etc.) could be shared among the set-top boxes.

As discussed above, the set-top box 100 integrates the analog tuner 104 with the satellite receiver 106 and the audio/video backend. This makes it possible to further reduce the cost of the bill of materials and external components.

Although the set-top box invention discussed herein has been described in terms of a satellite receiver, the set-top box could be used for other types of receivers including cable, cable modem, terrestrial television, or other delivery systems that include or require set-top box functionality for television, and/or Internet connectivity.

Figure 2:
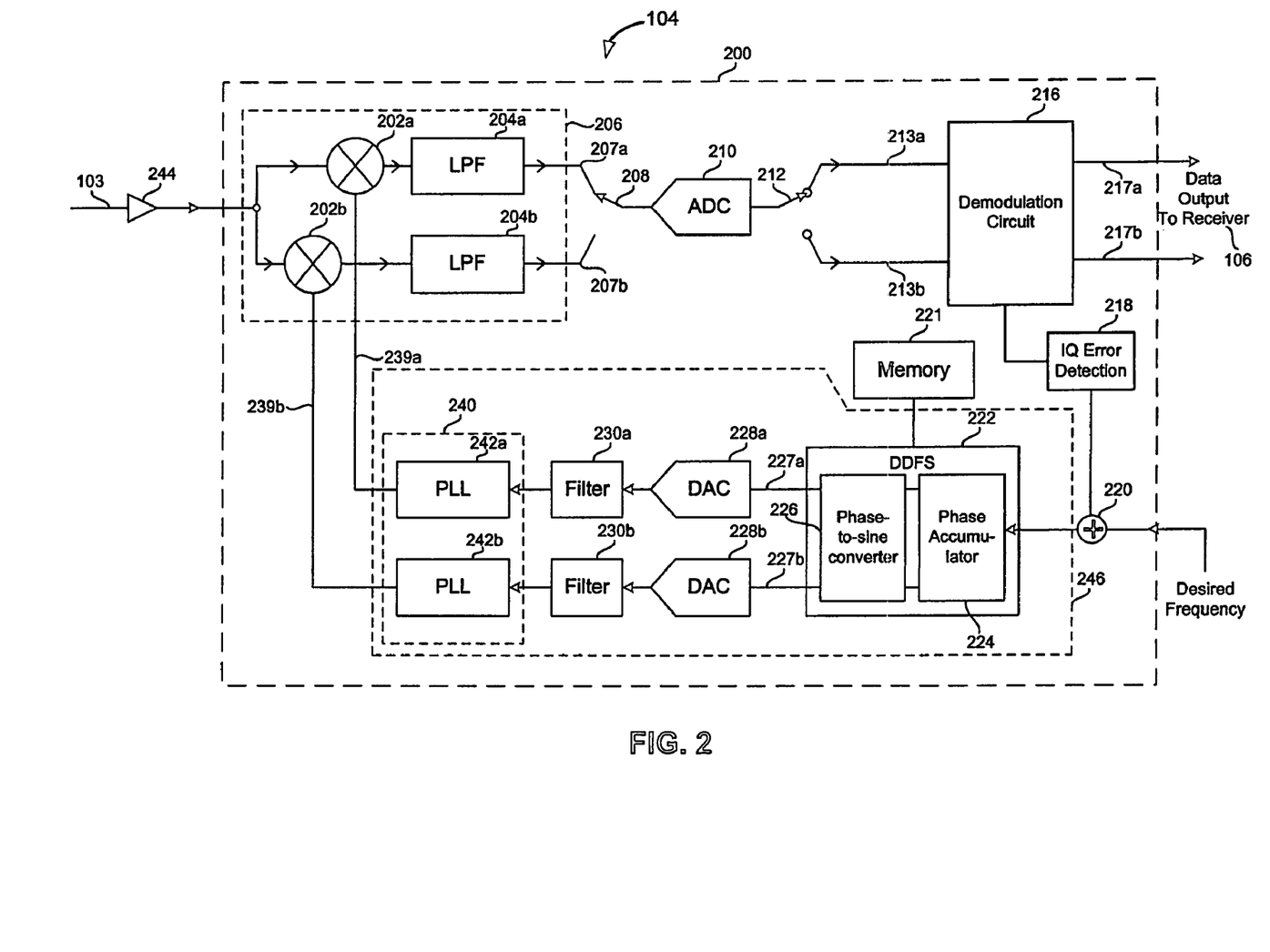
FIG. 2 illustrates a single conversion tuner having IQ correction, according to embodiments of the present invention.

FIG. 2 illustrates a quadrature direct conversion tuner 200 in which quadrature components of a local oscillator signal are independently generated according to an embodiment of the present invention. The tuner 200 is one embodiment of the analog tuner 104 that can be used in integrated set-top box 100. The tuner 200 includes a direct down conversion circuit 206, an analog-to-digital converter (ADC) 210, a demodulation circuit 216, a memory 221, an IQ Error Detection circuit 218, and a local oscillator circuit 246. The direct down-conversion circuit 206 includes quadrature mixers 202a and 202b, and lowpass filters 204a and 204b. The local oscillator circuit 246 includes: a DDFS 222 having a phase accumulator 224 and a phase-to-sine converter 226, digital-to-analog converters (DACs) 228a and 228b, filters 230a and 230b, and a PLL 240. A low noise amplifier 244 may be included off-chip, on a separate substrate.

During operation, the direct down conversion circuit 206 receives the RF input signal 103. The RF input signal 103 is optionally amplified by the low-noise amplifier 244. For instance, a discrete low-noise amplifier, such as Broadcom part number BCM 3405, can be coupled to the input of the quadrature direct down conversion circuit 206. In an alternate embodiment, the amplifier 244 is integrated on-chip with the quadrature direct down-conversion circuit 206.

The mixers 202a and 202b mix the RF input signal 103 and a quadrature local oscillator signal 239 to provide a down-converted signal. More specifically, mixer 202a mixes the RF input signal 103 and a first quadrature component 239a of the local oscillator signal to provide a first down-converted quadrature component 207a. Mixer 202b mixes the RF input signal 103 and a second quadrature component 239b of the local oscillator signal to provide a second down-converted quadrature component 207b. The first and second quadrature components 207a and 207b can be at baseband or a low frequency IF depending on the operating frequency of the local oscillator. One or more low pass filters (LPFs) 204 can be included to reduce or eliminate unwanted signal energy.

A multiplexer 208 selects the first down-converted quadrature component 207a or the second down-converted quadrature component 207b to be sent to the analog-to-digital converter (ADC) 210. The receiver 200 includes a single ADC 210 for illustrative purposes, though the scope of the present invention is not limited in this respect. Separate ADCs could be used for the quadrature channels. However, a single ADC does not cause gain and/or linearity mismatches between the quadrature components that can occur when two ADCs are utilized. Further, a single ADC reduces the size of the tuner 200, as compared to using two ADCs.

The multiplexer 208 interleaves samples of the first down-converted quadrature component 207a and the second down-converted quadrature component 207b to provide an interleaved sample of the down-converted quadrature components to the ADC 210. In one embodiment, the multiplexer 208 toggles at a rate equal to at least twice the effective sampling rate of the ADC 210, so that both quadrature components can be adequately sampled. For example, sampling at this rate can facilitate accurate conversion of the down-converted quadrature components 207a and 207b by the ADC 210.

The ADC 210 converts the interleaved sampling of the down-converted quadrature components into a digital signal. According to an embodiment, the sampling rate of the ADC 210 equals the interleaving rate of the multiplexer 208 plus an over sampling ratio. By oversampling, the ADC 210 can extend the noise performance of the ADC 210 and/or reduce the number of bits required by the ADC 210.

A demultiplexer 212 de-interleaves the digital samples of the down-converted quadrature components provided by the ADC 210 to provide quadrature digital signals 213a and 213b. In an embodiment, the de-multiplexer 212 toggles at a rate equal to the toggle rate of the multiplexer 208.

The demodulation circuit 216 receives quadrature digital signals 213a and 213b and provides a demodulated signal 217. The demodulated signal 217 is a data output that can be further processed for audio/video display, etc. In an embodiment, the demodulation circuit 216 is a quadrature amplitude modulation (QAM) demodulation circuit. For example, the demodulation circuit 216 can include a Nyquist filter, a variable rate symbol demodulator, an equalizer, and a carrier recovery loop (all not shown for convenience).

An IQ error detection circuit 218 is coupled to the demodulation circuit 216 and determines an amplitude and/or phase error between the I and Q channels. The IQ error detection circuit 218 can also include a carrier tracking loop that determines any frequency error in the down-converted signals 207a and 207b, which can then be corrected by the local oscillator circuit 246. The IQ error detection circuit 218 forwards the IQ error to a summer 220, which also receives a desired frequency for down-conversion. The desired frequency identifies the desired frequency or channel that is to be selected from the RF input signal 103. The local oscillator circuit 246 then sets the frequency of the local oscillator signal based on the selected channel of the RF input signal 103. The local oscillator circuit 246 also adjusts quadrature LO components 239a and 239b so as to correct any IQ amplitude or phase errors, as discussed further below.

The local oscillator circuit 246 includes a Direct Digital Frequency Synthesizer (DDFS) 222 and a memory 221 to generate a digital representation of the local oscillator signal. The memory 221 stores a read-only memory (ROM) lookup table. The ROM lookup table includes a plurality of entries, where each entry represents a phase of the local oscillator signal or a sine or cosine thereof. The DDFS 222 can retrieve an entry from the ROM lookup table at each cycle or half-cycle of the local oscillator clock, for example, to provide the digital representation of the local oscillator signal.

The DDFS 222 generates a digital sinewave having IQ components based on the desired channel input from the summer 220. The DDFS 222 digitally converts phase information relating to the local oscillator signal to a digitized sinusoidal waveform. The DDFS 222 receives the phase information from the memory 221. The DDFS 222 provides faster frequency switching, lower phase noise, and/or higher frequency resolution, as compared to standard phase-locked loop (PLL) frequency synthesizers.

The DDFS 222 includes a phase accumulator 224 to receive phase information relating to the local oscillator signal with each successive clock cycle of the local oscillator circuit 246. For example, the phase accumulator 224 can receive first phase information during a first clock cycle, and second phase information during a second clock cycle, and so on.

The DDFS 222 further includes a phase-to-sine converter 226 to convert phase information received from the memory 221 into a digitized sinusoidal waveform. For example, the phase-to-sine converter 226 can provide a first waveform representing the sine of the phase information and a second waveform representing the cosine of the phase information. The first waveform is a first quadrature component 227a of the local oscillator signal, and the second waveform is a second quadrature component 227b of the local oscillator signal, wherein the first and second components are digital representations of the local oscillator signal.

According to another embodiment, the memory 221 also stores a frequency offset value. For example, the offset value can indicate a difference between the actual frequency of the local oscillator signal and the desired frequency of the local oscillator signal. The frequency of the local oscillator signal can be set based on the offset value. For instance, the offset value can be combined with the local oscillator signal to provide a frequency-shifted local oscillator signal.

The memory 221 can also store a phase offset that indicates a phase difference between quadrature components of the local oscillator signal, determined by the demodulation circuit 216, for example. The offset value can be used to adjust the phase of at least one of the quadrature components of the local oscillator signal. Utilizing the offset value to correct the phase difference between the quadrature components of the local oscillator signal can eliminate the need for other quadrature correcting circuitry or software. For example, correcting the phase offset of the local oscillator signal using the DDFS 222 can reduce the number of components needed in the receiver 200, thereby reducing the cost of the receiver in an embodiment.

In summary, the quadrature components of the local oscillator signal are generated independently in accordance with the embodiment shown in FIG. 2. Therefore, the DDFS 222 reduces any gain mismatch or phase mismatch between the quadrature components.

The frequency of the local oscillator signal can be based on a frequency control word associated with the local oscillator signal. For instance, a clock signal can be multiplied by the frequency control word to calculate the frequency of the local oscillator signal. The offset value stored in the memory 221 can be used to calculate the frequency control word associated with the local oscillator signal. In an embodiment, the offset value is used to set the frequency of at least one of the quadrature components of the local oscillator signal.

According to another embodiment, the receiver 200 includes two DDFSs. For instance, a first DDFS can be used to convert phase information relating to a first quadrature component of the local oscillator signal to a first digitized sinusoidal waveform. The second DDFS can be used to convert phase information relating to a second quadrature component of the local oscillator signal to a second digitized sinusoidal waveform.

The digital representations 227 of the local oscillator quadrature components are provided to digital-to-analog converters (DACs) 228. The DACs 228 can convert the digital representations into analog local oscillator signals. For instance, the DACs 228 can directly generate the analog local oscillator signals. Alternatively, the DACs 228 can generate reference signals, which can be used by phase-locked loops (PLLs), such as PLLs 242, to generate the analog local oscillator signals 239a and 239b as shown in FIG. 2.

Filters 230 are coupled to the output of the DACs 228 so as to reduce or eliminate unwanted frequencies from the quadrature local oscillator signals. The filters 230 can be low pass filters or bandpass filters. According to an embodiment, the filters 230 are narrow-band bandpass filters. For direct conversion, the filters 230 can be set at a particular frequency or range of frequencies that represents the desired channel of the RF input signal 103. In a first embodiment, the passband of the filters 230 are tunable and set based on the frequency of the local oscillator signal set by the local oscillator circuit 246. In a second embodiment, the passband of the filters 230 are set at a predetermined frequency or range of frequencies, and the local oscillator circuit 246 manipulates the frequency of the local oscillator signal to be within the passband of the filters 230. For example, the local oscillator circuit 246 can multiply the frequency of the local oscillator signal by a factor based on the selected channel of the RF input signal 103.

Phase Lock Loops (PLLs) 242 are coupled to the outputs of the filters 230, and provide the quadrature components 239a and 239b of the local oscillator signal to the direct down conversion circuit 206 to be mixed with the RF input signal 103. A PLL 242 is included for each quadrature component of the local oscillator signal. However, a single PLL can be used to filter both quadrature components.

The PLLs 242 can multiply the frequency of the local oscillator signal by a predetermined factor. For example, the PLL 242 can multiply the frequency of the local oscillator signal by a factor in the range from approximately two to approximately thirty. Other factors could be used. The PLLs 242 can increase the frequency of the local oscillator signal by a factor of six in a set-top box system, for example. The PLLs 242 can increase the frequency of the local oscillator signal by a factor of twelve in a satellite communication system, to provide another example.

Using the PLLs 242 to multiply the frequency of the local oscillator signal by a fixed value allows the DACs 228 to sample at a lower rate. For example, the sampling rate of the DACs 228 is decreased by a factor that is proportional to the factor by which the frequency of the local oscillator is multiplied in an embodiment. Using the PLLs 228 to multiply the frequency of the local oscillator signal by a fixed value can enable the size of the PLLs 228 to be reduced, as compared to the situation in which the PLLs 228 are used to multiply the frequency of the local oscillator by a variable factor to generate the frequency of the local oscillator signal.

According to an embodiment of the present invention, the direct down conversion circuit 206, the demodulation circuit 216, and the local oscillator circuit 246 are on a common substrate. One or more of the multiplexer 208, the ADC 210, the demultiplexer 212, the DAC 228, the memory 221, IQ correction circuit 218, and the filters 230 can be on the common substrate, as well. Combining elements, such as those mentioned above, on a common substrate reduces the cumulative circuit area required by the elements, and therefore the overall chip cost.

The quadrature direct conversion tuner 200 is further described in U.S. patent application Ser. No. 10/902,477, titled "Apparatus and Method for Integration of Tuner Functions in a Digital Receiver", which is incorporated by reference herein in its entirety.

Figure 3:
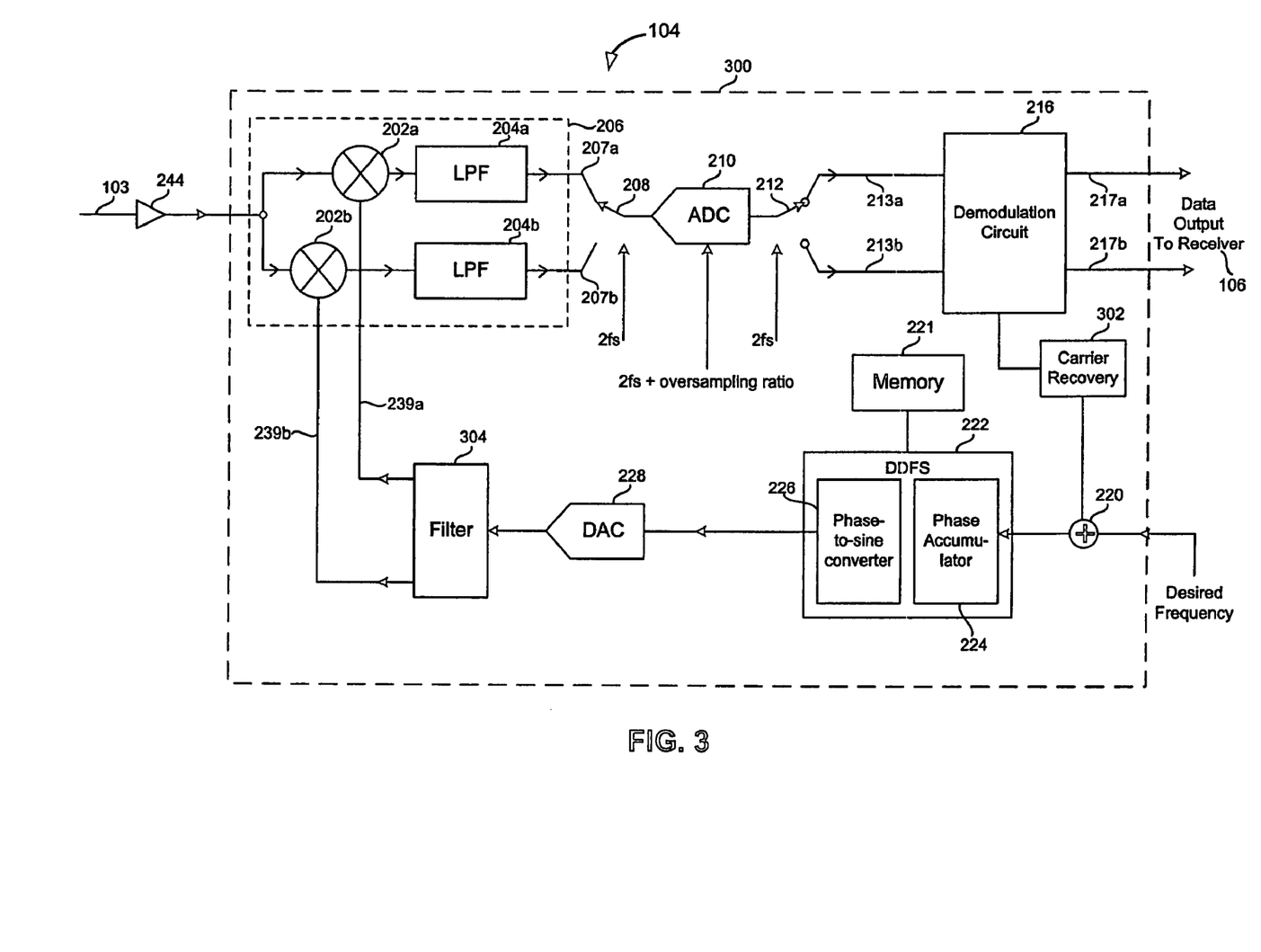
FIG. 3 illustrates a single conversion tuner having frequency correction, according to embodiments of the present invention.

FIG. 3 illustrates a further tuner embodiment 300, that uses a single DAC 228, filter 304, and a carrier recovery loop 302 instead of an IQ error detection circuit. The carrier recovery loop 302 determines any frequency offset between the IQ channels. Accordingly, the tuner 300 is only capable of making frequency corrections to the local oscillator signals 239 and cannot make IQ phase corrections. However, the single DAC 228 utilizes less substrate area than using two DACs 228.

Figure 4:
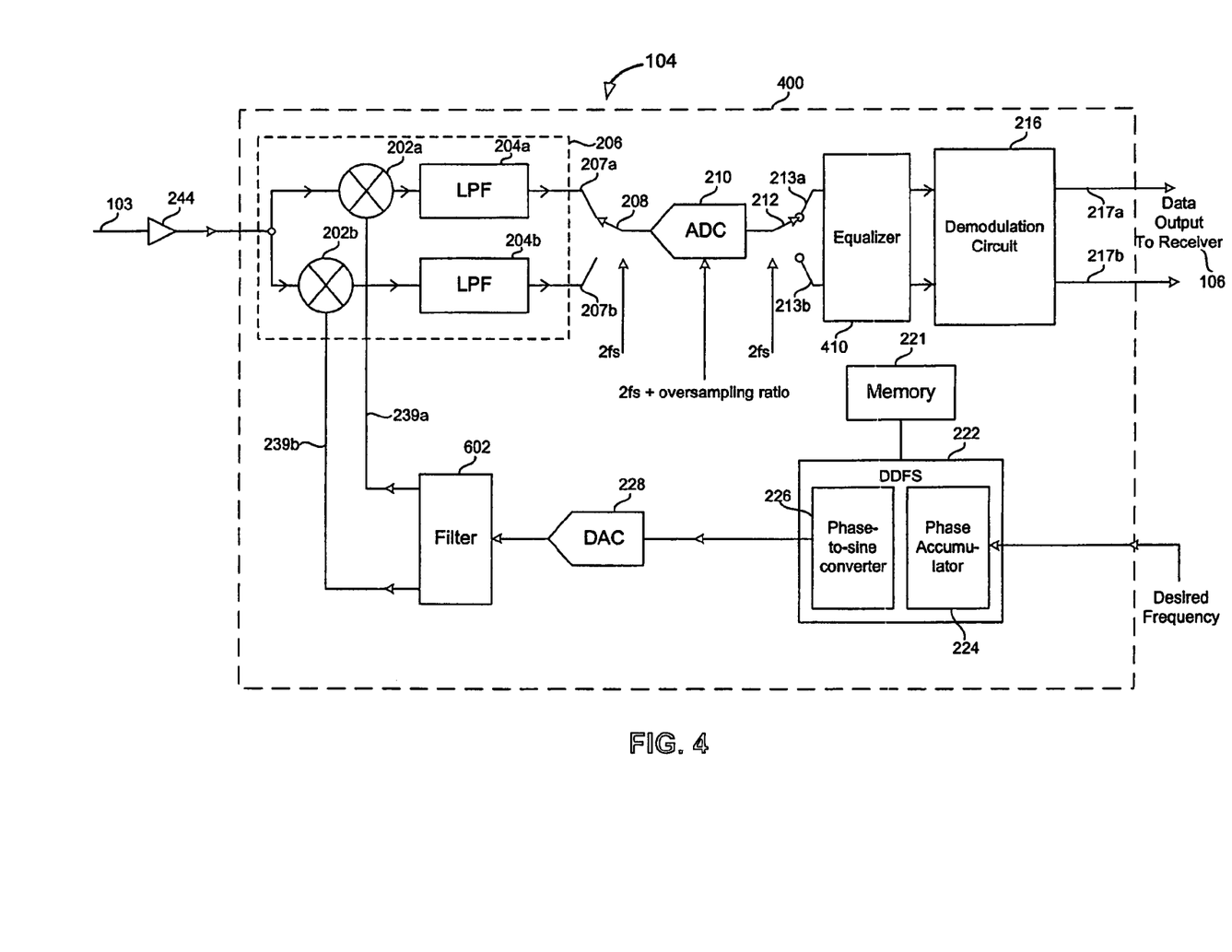
FIG. 4 illustrates a direct conversion tuner having IQ correction using an equalizer circuit.

FIG. 4 illustrates a quadrature direct conversion tuner 400 having a baseband equalizer 410 according to an embodiment of the present invention. In embodiments, the baseband equalizer 410 is an asymmetric equalizer that is used to correct IQ errors as will be discussed further below.

Quadrature paths of the tuner 400 are generally not completely isolated from each other. For instance, a first quadrature component traveling along a first path 213a can include information from a second quadrature component traveling along a second path 213b, and vice versa. The baseband equalizer 410 can determine how much information from one quadrature component is included in the other quadrature component, and vice versa. The baseband equalizer 410 generally subtracts the second quadrature component information or a portion thereof from the first quadrature component.

Figure 5:
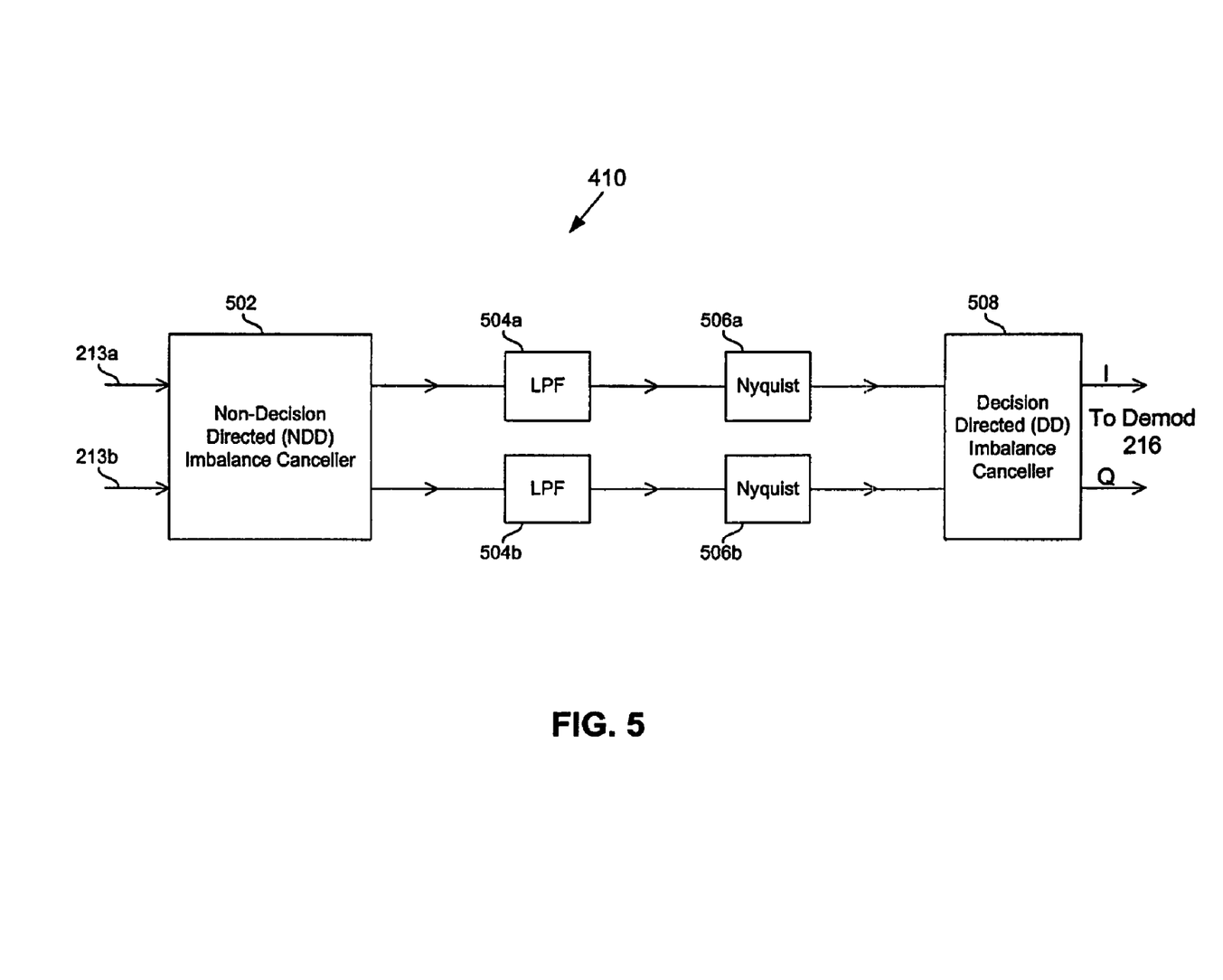
FIG. 5 illustrates a first embodiment of the equalizer used in the direct conversion tuner, the equalizer having a non-decision directed stage and a decision directed stage.

FIG. 5 further illustrates the baseband equalizer 410. Referring to FIG. 5, the equalizer 410 is a two stage equalizer having a non-decision directed (NDD) imbalance canceller 502, low pass filters 504, Nyquist filters 506, and a decision directed (DD) imbalance canceller 508. In embodiments, the NDD imbalance canceller 502 is a DC IQ Imbalance Canceller that corrects for gain and phase imbalance. Whereas, the DD imbalance canceller 508 is an asymmetric equalizer that corrects for any type of IQ imbalance, including sampling imbalance.

The equalizer 410 is further described in U.S. Provisional Patent Application No. 60/661,165, filed on Mar. 14, 2005, which is incorporated herein by reference.

Figure 6:
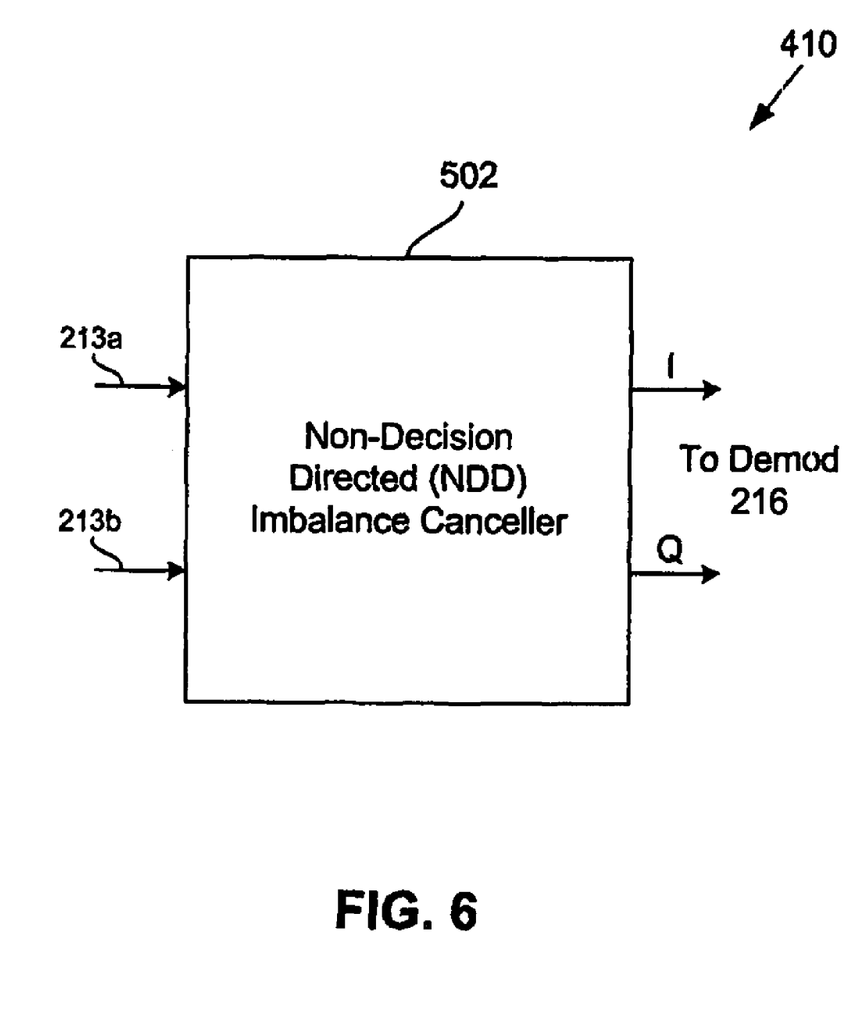
FIG. 6 illustrates a second embodiment of the equalizer used in the direct conversion tuner, the equalizer having only a non-decision directed stage.

FIG. 6 illustrates a second embodiment of the equalizer 410, the equalizer having only the non-decision directed stage 502. The IQ imbalance correction is still accomplished with the NDD imbalance canceller 502.

Figure 7:
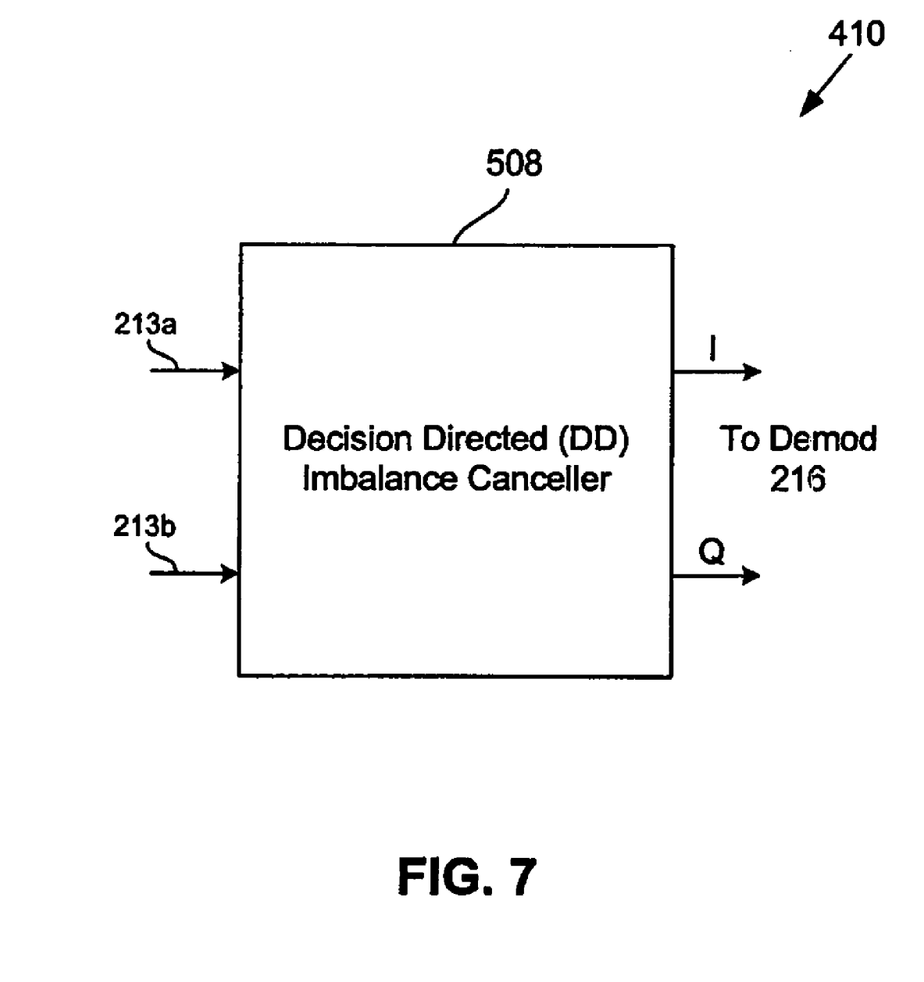
FIG. 7 illustrates a third embodiment of equalizer used in the single conversion tuner, the equalizer having only a decision directed stage.

FIG. 7 illustrates a third embodiment of equalizer 410, the equalizer having only a decision directed stage 508. The IQ imbalance correction is still accomplished with the DD imbalance canceller 508.

Conclusion

Example embodiments of the methods, systems, and components of the present invention have been described herein.

As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A set-top box, comprising:
a common single chip semiconductor substrate;
an analog tuner;
a digital receiver coupled to an output of said analog tuner; and
one or more audio and video back-end circuits coupled to an output of said digital receiver, said analog tuner, digital receiver, and said one or more audio and video back-end circuits being implemented on said common single chip semiconductor substrate, wherein
said analog tuner includes:
a quadrature down-conversion circuit configured to produce a quadrature down-converted signal by mixing a radio frequency (RF) signal received at an input of said analog tuner with a quadrature local oscillator signal;
a direct digital frequency synthesizer (DDFS) configured to produce a digital representation of said quadrature local oscillator signal including independently generated quadrature components determined from a stored lookup table;
at least one digital-to-analog-converter (DAC), coupled to said DDFS, configured to sample said digital representation of said quadrature local oscillator signal to provide an analog local oscillator signal; and
at least one phase locked loop circuit (PLL), coupled to said at least one DAC, configured to multiply said analog local oscillator signal with a fixed value to provide said quadrature local oscillator signal, said fixed value being associated with a sampling frequency of said DAC.

2. The set-top box of claim 1, wherein said analog tuner is a single conversion tuner that is configured to down-convert a selected channel from a plurality of channels received at an RF input of said single conversion tuner.

3. The set-top box of claim 2, wherein said digital receiver is a QPSK digital receiver.

4. The set-top box of claim 1, wherein said one or more audio and video backend circuits comprises:
a divider module, coupled to said output of said digital receiver, configured to separate a video portion from an audio portion of said output of said digital receiver;
a video module, coupled to said divider module output, configured to process said video portion of said output of said digital receiver; and
an audio module, coupled to said divider module output, configured to process said audio portion of said output of said digital receiver.

5. The set-top box of claim 4, further comprising:
a universal serial bus interface, disposed on said common single chip semiconductor substrate, coupled to said audio and video modules.

6. The set-top box of claim 1, further comprising:
an AV security device disposed on said common single chip semiconductor substrate.

7. The set-top box of claim 1, further comprising:
an external memory interface disposed on said common single chip semiconductor substrate.

8. The set-top box of claim 7, wherein said external memory interface is a dynamic random access memory (DRAM) interface.

9. The set-top box of claim 1, further comprising:
a peripheral interface disposed on said common single chip semiconductor substrate.

10. The set-top box of claim 1, wherein said analog tuner is a direct conversion analog tuner.

11. The set-top box of claim 1, wherein an output of said digital receiver includes Moving Picture Experts Group (MPEG) packets, and wherein said one or more audio and video back-end circuits comprises:
a divider module configured to separate video MPEG packets from audio MPEG packets.

12. The set-top box of claim 11, wherein said one or more audio and video back-end circuits comprises:
a video module configured to process said video MPEG packets to produce a video output; and
an audio module configured to process said audio MPEG packets to produce an audio output.

13. The set-top box of claim 12, wherein said video module comprises:
a video decoder configured to decode said video MPEG packets;
a graphics module, coupled to an output of said video decoder, configured to add text to said video MPEG packets;
a video encoder, coupled to an output of said graphics module; and
a video digital-to-analog converter configured to convert an output of said video encoder to analog.

14. The set-top box of claim 12, wherein said audio module comprises:
an MPEG audio decoder configured to receive and to decode said audio MPEG packets; and
an audio digital-to-analog converter, coupled to an output of said MPEG audio decoder, configured to convert an output of said MPEG audio decoder to analog.

15. The set-top box of claim 1, further comprising:
an in-phase/quadrature-phase (IQ) error detection circuit configured to determine an IQ error of said quadrature down-converted signal.

16. The set-top box of claim 15, further comprising:
a local oscillator circuit configured to generate said quadrature local oscillator signal based on an output of said IQ error detection circuit.

17. The set-top box of claim 16, wherein said local oscillator circuit is configured to correct any IQ phase imbalance determined by said IQ error detection circuit.

18. The set-top box of claim 17, wherein said local oscillator circuit comprises:
at least one low pass filter (LPF) coupled to said at least one DAC.

19. The set-top box of claim 1, wherein said lookup table further comprises:
at least one of a phase value, a sine value, and a cosine value for generating said quadrature local oscillator signal.

20. The set-top box of claim 1, wherein said DDFS is configured to adjust at least one of a frequency, a gain, and a phase of said quadrature local oscillator signal, using at least one of a frequency offset value of said stored lookup table and said phase offset value, to reduce at least one of a frequency, a gain, and a phase mismatch of at least one of said quadrature components of said quadrature local oscillator signal.

21. The set-top box of claim 1, wherein said analog tuner comprises:
an analog-to-digital converter (ADC), coupled to an output of said quadrature down-conversion circuit, configured to digitize said quadrature down-converted signal; and
a demodulation circuit, coupled to an output of said ADC, configured to demodulate said digitized quadrature down-converted signal to produce a data output.

22. The set-top box of claim 21, further comprising:
a de-multiplexer coupled between said output of said ADC and an input of said demodulation circuit.

23. The set-top box of claim 21, further comprising:
an equalizer coupled between said ADC converter and said demodulation circuit, said equalizer configured to perform IQ imbalance correction.

24. The set-top box of claim 23, wherein said equalizer comprises:
a non-decision directed portion configured to receive an output of said ADC converter and a decision directed portion coupled to an output of said non-decision directed portion.

25. The set-top box of claim 23, wherein said equalizer comprises:
a non-decision directed portion configured to receive an output of said ADC converter.

26. The set-top box of claim 23, wherein said equalizer comprises:
a decision directed portion configured to receive an output of said ADC converter.

27. The set-top box of claim 21, further comprising:
a multiplexer coupled between said output of said quadrature down-conversion circuit and an input of said ADC.

28. The set-top box of claim 27, wherein said multiplexer is configured to interleave a first down-converted quadrature component and a second down-converted quadrature component of said quadrature down-converted signal to provide an interleaved sampling of said quadrature down-converted signal to said ADC, and said ADC is configured to convert said interleaved sampling of said quadrature down-converted signal to a digital representation.

29. The set-top box of claim 1, wherein said stored lookup table further comprises:
a phase offset value for correcting a phase difference between said quadrature components; and
a frequency offset value for indicating a difference between a current operating frequency of a local oscillator and a desired operating frequency of said local oscillator,
wherein said current operating frequency is calculated by multiplying a clock signal with a frequency control word associated with said local oscillator, said frequency control word being calculated based on said frequency offset value.

30. The set-top box of claim 29, wherein said current operating frequency is combined with said frequency offset value to change said current operating frequency to be equal to said desired operating frequency.

* * * * *